United States Patent [19]
King

[11] 3,813,032
[45] May 28, 1974

[54] METHOD FOR TESTING MOS MEMORY STORE DEVICE
[75] Inventor: James L. King, Phoenix, Ariz.
[73] Assignee: Honeywell Information Systems, Inc., Waltham, Mass.
[22] Filed: July 30, 1973
[21] Appl. No.: 383,930

[52] U.S. Cl. ............ 235/153 AC, 340/173 R, 444/1
[51] Int. Cl. ...................... G11c 29/00, G06f 11/04
[58] Field of Search .......... 235/153 AC; 340/173 R; 444/1

[56] References Cited
UNITED STATES PATENTS
3,659,088  4/1972  Boisvert ...................... 235/153 AC
3,719,929  3/1973  Fay et al. ..................... 235/153 AC Primary Examiner—Malcolm A. Morrison
Assistant Examiner—R. Stephen Dildine, Jr.
Attorney, Agent, or Firm—James A. Pershon

[57] ABSTRACT

A method for testing a memory store comprised of metal-oxide semiconductor (MOS) devices by selecting a cell address most likely to affect or disturb a test cell of the MOS memory store. All storage cells are set to a charged condition. The test and disturb cells are charged with opposite charges and then toggled with reversed charges after a period of time. After another period of time, the test cells are then checked for an error condition, a charge picked up by migrating electrons. The procedure may be exercised by a computer program.

10 Claims, 5 Drawing Figures

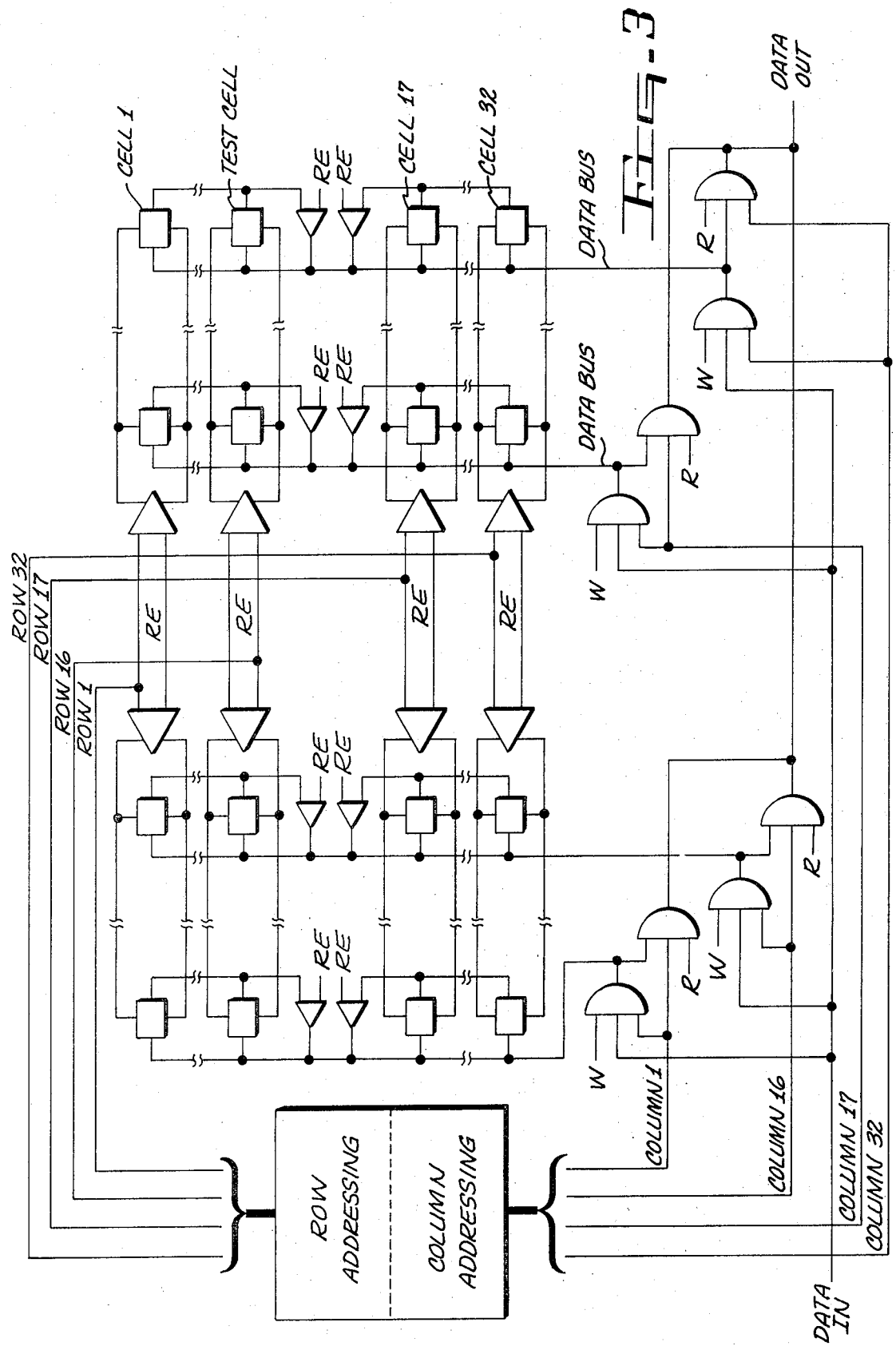

(A) KDT       LDX7    TADD                KDT TEST
              EAX2    0

KDT1      EAX3    0,7
              ANX3    =0777700,DU         SET UP 5 DISTURB LOCATIONS
              ORX3    DB,2                X3 = DISTURB ADDRESS
              STX7    *+1
              CMPX3   *,DU                DONT LET DISTURB = TEST ADDRESS
(B)           TNZ     *+2
              EAX3    2,3
              EAX6    0,7
              ANX6    =0774000,DU
              EAX5    2,6

LDAQ    VDD
              RPD     0,4                 STORE VDD ON CHIP
              STAQ    0,6
(C)           STAQ    0,5
              RPD     0,4
              STAQ    0,6
              STAQ    0,5

(D)           LDAQ    VSS                 STORE VSS IN DISTURB LOCATION
              STAQ    0,3

(E)           LDAQ    VDD                 STORE VDD IN TEST LOCATION
              STAQ    0,7

LDT     =0400000,DL
              LDI     =0600,DL (F)           LDAQ    0,3                 READ DISTURB LOCATION

LDI     =0200,DL
    KDT2      NOP     0                   DELAY 500 MICRO SEC.
              NOP     0
(G)           NOP     0
              STT     TEMP
              SZN     TEMP
              TPL     KDT2

(H)           LDAQ    VSS                 STORE VSS IN TEST LOCATION
              STAQ    0,7

(I)           LDAQ    VDD                 STORE VDD IN DISTURB LOCATION
              STAQ    0,3

LDT     =0200000,DL         DELAY 250 MICRO SEC.
    KDT3      NOP     0
              NOP     0
(J)           NOP     0
              STT     TEMP
              SZN     TEMP
              TPL     KDT3

LDA     PER
              STA     FPAR+1

LDAQ    VSS
(K)           CMPAQ   0,7                 TEST TEST LOCATION
              TNZ     CER
```

*Fig-4a*

```
                STZ     FPAR+1
                EAX6    0,7                 REPEAT FOR NEXT TEST PATTERN
                ANX6    =O774000,DU
                EAX5    2,6
                LDAQ    VDD1                STORE VDD ON CHIP
                RPD     0,4
                STAQ    0,6
                STAQ    0,5
                RPD     0,4
                STAQ    0,6
                STAQ    0,5
                LDAQ    VSS1                STORE VSS IN DISTURB LOCATION
                STAQ    0,3
                LDAQ    VDD1                STORE VDD IN TEST LOCATION
                STAQ    0,7
                LDT     =O400000,DL
                LDI     =O600,DL
                LDAQ    0,3                 READ DISTURB LOCATION
                LDI     =O200,DL            DELAY 500 MICRO SEC.
(L)     KDT4    NOP     0
                NOP     0
                NOP     0
                STT     TEMP
                SZN     TEMP
                TPL     KDT4
                LDAQ    VSS1                STORE VSS IN TEST LOCATION
                STAQ    0,7
                LDAQ    VDD1                STORE VDD IN DISTURB LOCATION
                STAQ    0,3
                LDT     =O200000,DL         DELAY 250 MICRO SEC.
        KDT5    NOP     0
                NOP     0
                NOP     0
                STT     TEMP
                SZN     TEMP
                TPL     KDT5
                LDA     PER
                STA     FPAR+1
                LDAQ    VSS1
                CMPAQ   0,7                 TEST TEST LOCATION
                TNZ     CER

STZ     FPAR+1
(M)             EAX2    1,2
                CMPX2   6,DU
                TNZ     KDT1                REPEAT FOR ALL DISTURB LOCATION

KDT6    TRA     0,1                 RETURN
```

*Fig. 4b*

METHOD FOR TESTING MOS MEMORY STORE DEVICE

BACKGROUND OF THE INVENTION

The present invention relates generally to a test procedure for memory stores and more particularly to a computer program for performing tests on a random-access memory store composed of metal-oxide semiconductor cells while assembled as a subsystem of a data processing system.

1. Field of the Invention

The memory store unit of a data processing system is most susceptible to errors mainly as a result of the multitude of storage units each required to perform an individual storage function. The memory storage units must perform completely error free, for one bit of information lost could result in disastrous consequences. As a result all memory storage units are thoroughly checked first as an individual part, then after assembly into a subunit of the memory store.

Manufacturers of the subunits for memory stores test each unit in an elaborate testing system to discover and discard any units which may fail in the environment required of the memory store. For the most part these testing procedures are sufficient to discover any subunits susceptible of errors. However, in the case of the MOS storage units, the devices seem to exhibit different characteristics when assembled into an array. It is for this reason that the present procedure was developed.

2. Description of the Prior Art

Most prior art memory storage units were composed of magnetic cores which were placed into either one of two states to represent a binary bit of information. Elaborate procedures including a computer test program were developed to perform program sequences for worst case conditions known to cause problems such as delta noise occurring as a result of the remanent magnetization of the core array. The remanent magnetization of a core and the shifts of the remanent state when a core is stimulated by half read and write currents were tested by the use of a computer program which selected the worst case conditions, provided the impulses which actuated the cores and then tested the cores for their remanent state to test for errors or marginal conditions.

With the advent of MOS memory arrays, an entirely new test procedure is required. The manufacturers of the MOS devices check each substrate before placing the substrate into an array and also check each array before shipping for placement into a memory store unit. This is normally sufficient for semiconductors used as logic devices but is not sufficient for the metal-oxide semiconductors used in memory stores especially random-access stores. The MOS devices exhibit a failure when installed into a memory store unit which hitherto was not detected, and caused failure rates which went undefined. For this reason a process is required to test assembled MOS memory stores for potential device failures easily and quickly such as by the use of a computer program.

SUMMARY OF THE INVENTION

The process according to the present invention tests a MOS random-access memory store device by selecting a cell address according to the address of the cell to be tested and most likely to affect or disturb a test cell of the device. All storage cells are first set to a charged condition. The test and disturb cells are charged and discharged, respectively, and then toggled to a reverse state after a period of time. After another period of time, the state of the test cells is checked. The process is repeated for each disturb address selected.

The memory store test procedure according to the present invention comprises the steps of setting up the address of cells that will affect or disturb a cell that is to be tested according to the test cell address. All of the cells of the unit to be tested are then placed into a charge condition. The next step is to discharge the disturb cells by directing the discharged condition electrical potential to the disturb cells according to the disturb address. Then the test cell is placed into a charged condition by "writing" a charge potential into the test cell. The disturb cells are then placed into a read or write procedure to insure that these cells contain the discharge potential. The memory store unit is then retained in the charge and discharged condition for a period of time.

The test cell in the test location is then discharged by a discharge condition potential and the cells in the disturb location are placed in a charged condition by addressing the charge potential to the disturb cells. These conditions are retained for another period of time and then the test cell in the test location is checked. If the test cell has gained a charge, an error condition is signified.

A new disturb address comprising different disturb cells is then addressed and the above steps are repeated to check the effect of different cell charge patterns on the test cell and on other cells of the MOS substrate.

It is, therefore, an object of the present invention to provide an enhanced method for testing memory store systems.

It is a more particular object of the present invention to provide a test procedure for detecting a surface charge failure mode in a MOS memory storage device by the use of a test program.

It is another object to provide a computer program which tests a MOS random access memory storage unit while in the system mode.

It is still another object to provide a test procedure to detect a surface charge failure mode in MOS memory storage devices by selecting a group of cells which share a common data bus to the cell to be tested and to check for a charge migration to detect a failure in the memory storage device.

It is yet another object to provide a test process which detects a charge migration to a test cell after toggling charges to a test cell and a cell which shares a common data bus with the test cell in a MOS memory storage system.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein:

FIG. 3 is a logic and block diagram of a portion of a MOS memory store device showing the cell interconnection; and FIG. 4 shows an illustrated computer program for implementing the test procedure represented in FIG. 2.

DESCRIPTION OF A PREFERRED EMBODIMENT

The purpose of the process according to the present invention is to detect a surface charge failure mode in memory storage devices, in particular the metal-oxide semiconductor (MOS) random access memories. The features that make MOS circuitry so attractive for memory use are very high circuit density, low cost, and low power dissipation. The MOS devices with low threshold technology allow the design and production of higher performance MOS circuits and provide a higher functional density on a monolithic chip than conventional MOS technologies. The large scale integration causes error detection and test problems which hitherto have gone undetected until a repeated failure indicates a problem of a particular cell in the MOS device. By the present invention the MOS random access memory store configuration can be tested in the system mode to isolate memory cell failures in the pretest of the memory store before use by a customer of the data processing system. The test process can also be used for standard maintenance service in the customer environment.

Figure 1:
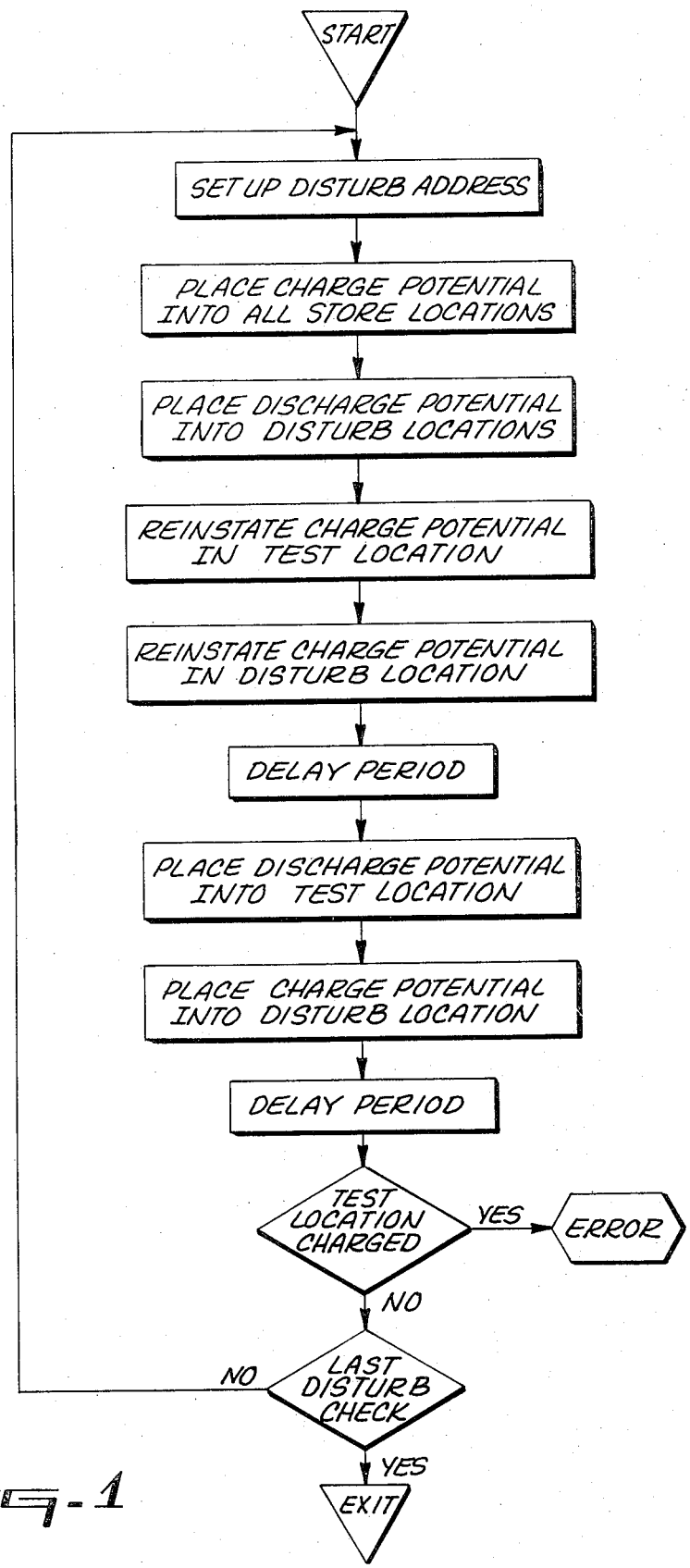
FIG. 1 is a step-by-step flow diagram of a method of performing the test procedure according to the present invention.

Referring now to FIG. 1, the step-by-step operation of the test process or program is shown. At the start of the program, the storage address of the memory store cell to be tested is first obtained. From this test cell address, the addresses of disturb cells are selected for each test cell. A disturb cell for purposes of the preferred embodiment of the present invention is defined as any cell that shares the common data bus of the test cell. In reality a disturb cell can be any cell except the remaining cells having the same row address as the test cell. This program uses only disturb cells on the column axis since these seem to be more likely to cause a reaction in the test cell.

The correspondence between the test cell and a cell to be selected as a disturb cell can be shown by referring to the layout of a typical MOS memory store chip as shown in FIG. 3. The MOS memory store shown comprises 1,024 memory cells arranged in 32 rows and 32 columns. Rows 1, 16, 17 and 32 and column 1, 16, 17 and 32 are shown representative of the 32 × 32 configuration. Common DATA BUSS leads connect all 32 cells of each column. A read signal R, a write signal W, and a refresh enable signal RE are shown activating appropriate gates of the configuration.

Referring now to FIG. 3 and assuming for this explanation that the row 16, column 32 cell is selected for the test cell as labled, the disturb cell selected would be any one of the cells, cell 1 to cell 15 or cell 17 to cell 32 of column 32. According to the preferred embodiment, five cells are randomly selected, one at a time to act as disturb cells. Thus for instance, cell 17 of column 32 could be addressed in the first step of the process shown in FIG. 1.

Referring again to FIG. 1, the next step of the test procedure is to place a charge potential into all locations of the memory store. All of the cells of the section to be tested are placed into the charge state. In FIG. 3, this would mean that all 1,024 cells of the MOS memory store chip would be activated for a WRITE mode and placed into the charge state. Then the cell of the disturb location, cell 17 of column 32, and the cell of the test location, cell 16 of column 32, are toggled by first placing a discharge potential into the disturb cell called out by the disturb address and then placing a charged potential into the test cell called out by the test address. The discharge potential in the disturb cell is then reinstated to insure that a discharge potential is in the disturb location. A delay period is then entered to await a migration of charge particles to the discharge locations. Then the discharge potential is placed into the test cell and the charge potential is placed into the disturb cell. Again a delay period is entered. The delay time periods must be less than the refresh time required of the semiconductor store.

The test cell is then checked to see if the cell has gained a charge. If the test cell has gained a charge, an error is indicated since some of the charge potential from the disturb cell has migrated into the test cell area. If the test location has not gained a charge, the next step in the process is to check whether there are further disturb cells to be checked on the particular test cell. As stated, in the preferred embodiment five disturb cells are used one at a time for each test cell. The disturb addresses check the most probable error conditions. The process is then repeated through the same steps as shown in FIG. 1 to test the test cell with the new disturb cell location.

The test procedure of the present invention is basically to discharge the disturb cell and charge the test cell, then wait a period of time, charge the disturb cell location and discharge the test cell location and then wait a second period of time. The toggling from discharge to charge apparently speeds up failures of the marginal cells in the MOS device. The indication of the failure appears to be that the charge from the disturb cell location migrates to the test cell location. The oscillation under the toggle conditions sets up the circumstances for the charge migration to occur. The reason for the error, the charge migration, is speculative since the actual reason for the test cell to gain a charge is not fully known. Since it is possible under actual operation for any sequence of data to be stored into the memory store, any situation which causes a discharged cell to gain a charge is intolerable even under the toggle conditions of this test.

Figure 2:
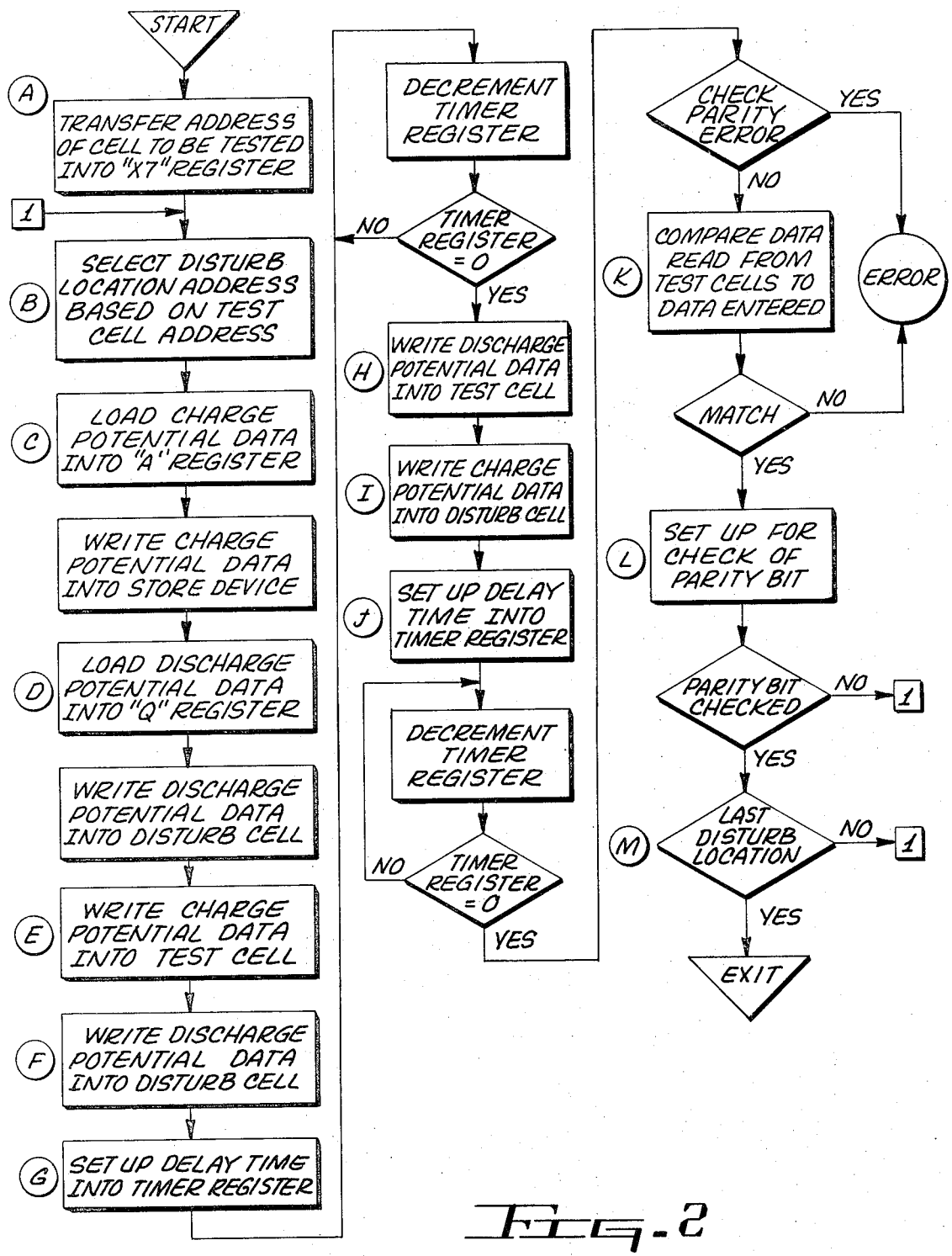
FIG. 2 shows a flow diagram illustrating the steps performed by a data processing system in performing the test procedures according to the present invention.

The MOS device used according to the test procedure more specifically shown in FIG. 2 is the silicon gate MOS large scale integration random access memory device number 1,103, the layout for a similar device is shown in FIG. 3. The 1,103 device identifies a particular MOS random access memory element using P-channel MOS devices integrated on a monolithic array. The element is placed in an 18 pin dual-in-line package. All of the bits in the random access memory store require refreshing every 2 milliseconds to maintain the data information stored in each cell. The charge potential V for the 1103 device is approximately a minus 25 volts. The discharge potential V for the 1103 device is approximately zero volts.

FIG. 2 shows the flow diagrams for the test programs as performed by a computer. The source listing codes for the memory store test program are shown in FIGS. 4a and 4b. The small circles shown in FIG. 2 containing letters of the alphabet identify the portions of the source listing referred to in that section of the flow diagram. For instance, on FIG. 2 a small circle containing the letter A shows that the start of the program has taken place along with the transfer of the cell to be tested into the X7 register. The letter A refers to the source listing shown in FIG. 4a identified at the beginning of the line by the letter A. Thus, the small coded circle identifies the source listing required to perform the operation shown in the block in the flow diagram.

FIGS. 4a and 4b show the significant portions of an exemplary program implementation of the memory store test program according to the present invention. The program is written in the GMAP language described, for example, in the Honeywell Series 600/6000 Programming Reference Manual No. BN86 for Implementation on any Honeywell G600 and H6000 Series Computer. Implementation of the present invention in the program of FIGS. 4a and 4b is apparent from an examination thereof and therefore except for comparison to the flow diagram of FIG. 2 is not described further herein.

Referring now to FIG. 2, at the start of the process the first step is to transfer the address of the cell to be tested into an X7 register. The disturb cell address is then selected based on the test cell address. As previously stated, for each test cell there are particular cells called disturb cells which will cause an error to occur if at all possible based on selected patterns of cells that share the common data bus of the test cell. The process then continues to load the data information into an A register which will cause a charge potential being placed into the memory.

The charge potential is written into all locations of the storage device by activating the DATA IN line (see FIG. 3) with the data from the A register. The data information that will cause a discharge potential is then placed into a Q register and is written into the disturb cell according to the disturb address previously selected. The logic for writing into MOS memory stores and for transferring data information into and out of data registers is well-known in the art and need not be further explained here.

The next step in the flow chart of FIG. 2 is to write the charge potential data information from the A register into the test cell. Effectively since all of the cells in the storage device were initially charged, this step reinstates the charge condition of the test cell. In MOS random access memory stores, the data information in each of the individual cells must be refreshed periodically or the data stored will dissipate.

In the next step shown as Section F of the comparison between the flow chart and the source listings of FIG. 4a, the discharge potential of the disturb cell is reinstated. The process then continues to set up a delay time into a timer register. The delay time according to the present invention is for 500 microseconds at this part of the program and therefore a number is set up into the timer register such that when the timer register is decremented by clock pulses, the timer register will be equal to zero after a 500 microsecond period of time. Then the flow chart continues by toggling the test cell and the disturb cell to the opposite charge condition. The next steps show that the discharge potential data information is written into the test cell and then the charge potential data information is written into the disturb cell. The discharge potential data information is obtained from the Q register and the charge potential is obtained from the A register. A delay time is then set into the timer register. This delay time is for 250 microseconds. The timer register is again decremented and will remain in the loop in the flow until the timer register is equal to zero at which time the flow continues by checking for a parity error.

Since most memory units generally comprise many MOS devices, several devices can be checked at one time, one test cell of each device. If only one test cell fails, the error will occur when the parity is checked. The occurrence of a parity error indicates that a single chip has failed. If no parity error occurs this still does not mean that any errors occurred but rather that possibly more than one chip of the MOS device failed and therefore the next step is to compare the data read from the test cells to the data entered into the cells. If a match occurs this means that there have been no failures and the process program continues. However, if a match does not occur then the program branches to show that an error condition has been reached.

Continuing with the process and assuming that a match has taken place, the next step in the process according to the present embodiment is to prepare for the check of a parity bit of the test address. In the present embodiment, the 1103 MOS device, the parity bit must be checked separately because of the implementation of the odd parity scheme in the H6000 data processing system. Therefore if the parity bit has not been checked, the program branches to the beginning of the flow chart, the 1 branch, to select a disturb cell address based on checking a parity bit of the test cell address and the process continues as before to check the parity bit storage cell.

The process continues after checking the parity bit and if no error has occurred, the process will continue to check whether the last disturb cell location address has been checked for the test cell address selected. In the process being described, generally five disturb cell addresses are selected to test the test cell. As stated previously, the disturb cell is selected for each cell to be tested according to the layout of the MOS device such that the disturb cells selected share the common data bus of the test cell, see FIG. 3. If all of the disturb cell addresses have not been checked, the process will branch to the beginning of the flow diagram to check all of the disturb addresses. After all of the disturb addresses for the particular test cells have been checked, the program will exit and either prepare for the testing of further combinations of test cells or to end the test of the MOS memory store.

Thus what has been shown is a computer program for testing MOS random access memory devices. It is obvious, however, that other test apparatus could be used performing the same operational steps as disclosed in FIGS. 1 and 2. A set of registers could be actuated to set up the addresses of the test cells and the disturb cells to be affected by the process. The charge potential could be obtained from the power supply and switched into and out of the locations that required the charge potential. Likewise the discharge potential could be selectively applied to the memory store device to accomplish to toggle action required according to the present invention. A timer could be actuated for delineating the delay period required by the present process. It should, therefore, be obvious that even though a computer program is shown as the preferred embodiment, standard hardware apparatus could be used to accomplish the procedures of the present invention.

The principles of the present invention have now been made clear in an illustrated embodiment. There will be immediately obvious to those skilled in the art many modifications of structure, arrangement, proportions, the elements, materials and components used in the practice of the invention. For instance, the steps according to the preferred embodiment show that the data information whether discharge or charge information is placed into the disturb cell first and then into the test cell. It would be obvious to reverse the procedures such that the potential is placed into the test cell first and then into the disturb cell without departing from the present invention which is to toggle the disturb and test cells. The appended claims are, therefore, intended to cover and embrace any such modifications, within the limits only of the true spirit and scope of the invention.

I claim:

1. A process for testing cells of a semiconductor memory store comprising the steps of:
   a. placing a charge potential into all cells including a test cell of the store;
   b. placing a discharge potential into a disturb cell;
   c. waiting a period of time less than a refresh cycle of the store;
   d. toggling the potential placed in the test cell and the disturb cell to reverse potentials;
   e. waiting a period of time less than a refresh cycle for a possible charge migration to the test cell; and
   f. checking the test cell for a charge potential.

2. A process according to claim 1 wherein the steps a through f are repeated for the same test cell using a different disturb cell.

3. A process for testing cells of a semiconductor memory store comprising the steps of:
   a. addressing a test cell location;
   b. obtaining an address of a disturb cell from the test cell location addressed;
   c. placing a charge potential into all cells of the store including the addressed test cell;
   d. addressing the disturb cell obtained;
   e. placing a discharge potential into the addressed disturb cell;
   f. waiting a period of time less than a refresh cycle of the store;
   g. placing a discharge potential into the addressed test cell;
   h. placing a charge potential into the addressed disturb cell;
   i. waiting a period of time less than a refresh cycle for a possible charge potential migration; and
   j. checking the test cell for a charge potential.

4. A process as defined by claim 3 further including the steps of:
   k. checking addressed disturb cell location for test cell being tested;
   l. repeating steps b–k until last disturb cell location is checked; and
   m. ending process after last disturb cell is checked.

5. A process for testing cells of a semiconductor memory store comprising the steps of:
   a. addressing a test cell location;
   b. obtaining an address of a disturb cell from the test cell location addressed;
   c. placing a charge potential into all cells of the store including the addressed test cell;
   d. addressing the disturb cell obtained;
   e. placing a discharge potential into the addressed disturb cell;
   f. reinstating the charge potential in the test cell;
   g. reinstating the discharge potential in the disturb cell;
   h. waiting a period of time less than a refresh cycle of the store;
   i. placing a discharge potential into the addressed test cell;
   j. placing a charge potential into the addressed disturb cell;
   k. waiting a period of time less than a refresh cycle for a possible charge potential migration;
   l. checking the test cell for a charge potential;
   m. checking addressed disturb cell location for test cell being tested;
   n. repeating steps b–m until last disturb cell location is checked; and
   o. ending process after last disturb cell is checked.

6. A process of testing cells of a semiconductor memory store by using a data processing system, said process comprising the steps of:
   a. placing charge potential data information into a first register;
   b. transferring placed charge potential data information into all cells of the store from the first register;
   c. placing discharge potential data information into a second register;
   d. addressing a disturb cell selected;
   e. transferring placed discharge potential data information from the second register into the addressed disturb cell;
   f. waiting a period of time less than a refresh cycle of the store;
   g. transferring placed discharge potential data information from the second register into the addressed test cell;
   h. transferring placed charge potential data information from the first register into the addressed disturb cell;
   i. waiting a period of time less than a refresh cycle for a possible charge migration to the test cell;
   j. retrieving data information from the memory store;
   k. comparing data retrieved to data entered;
   l. going to step m if comparison is not obtained otherwise going to step n;
   m. indicating error occurrence; and
   n. ending process.

7. A process as described in claim 6 wherein the steps d through n are repeated for the same test cell using a different disturb cell.

8. A process of testing cells of a semiconductor memory store by using a data processing system, said process comprising the steps of:

a. transferring address of cell to be tested into a first register;
b. selecting address of a disturb cell based on test cell address in first register;
c. placing charge potential data information into a second register;
d. transferring placed charge potential data information into all cells of the store from the second register;
e. placing discharge potential data information into a third register;
f. addressing the disturb cell selected;
g. transferring placed discharge potential data information from the third register into the addressed disturb cell;
h. waiting a period of time less than a refresh cycle of the store;
i. transferring placed discharge potential data information from the third register into the addressed test cell;
j. transferring placed charge potential data information from the second register into the addressed disturb cell;
k. waiting a period of time less than a refresh cycle for a possible charge migration to the test cell;
l. retrieving data information from the memory store;
m. comparing data retrieved to data entered;
n. going to step *o* if comparison is not obtained, otherwise going to step *p;*
o. indicating error occurrence; and
p. ending process.

9. A process as defined by claim 8 wherein step *n* comprises going to step *o* if comparison is not obtained, otherwise going to step *q:*
q. checking addressed disturb cell location; and
r. going to step *p* if last disturb cell is indicated, otherwise going to step *b.*

10. In a data processing system, a process of testing cells of a semiconductor memory store comprising the steps of:
a. transferring address of cell to be tested into a first register;
b. selecting address of a disturb cell based on test cell address in first register;
c. placing charge potential data information into a second register;
d. transferring placed charge potential data information into all cells of the store from the second register;
e. placing discharge potential data information into a third register;
f. addressing the disturb cell selected;
g. transferring placed discharge potential data information from the third register into the addressed disturb cell;
h. addressing the test cell selected;
i. transferring placed charge potential data information from the second register into the addressed test cell;
j. addressing the disturb cell selected;
k. transferring placed discharge potential data information from the third register into the addressed disturb cell;
l. placing a first delay time information into a timer register;
m. decrementing the information placed in the timer register;
n. going to step o if timer register is equal to zero otherwise returning to step *m;*
o. transferring placed discharge potential data information from the third register into the addressed test cell;
p. transferring placed charge potential data information from the second register into the addressed disturb cell;
q. placing a second delay time information into the timer register;
r. decrementing the information placed in the timer register;
s. going to step *t* if timer register is equal to zero otherwise returning to setp *r;*
t. retrieving data information from the memory store;
u. checking for a parity error on retrieved data information;
v. going to step aa if an error is indicated, otherwise going to step *w;*
w. comparing data retrieved to data entered;
x. going to step aa if comparison is not obtained, otherwise going to step *y;*
y. checking addressed disturb cell location;
z. going to step *bb* if last disturb cell is indicated, otherwise going to step *b;*
aa. indicating error occurrence; and
bb. ending process.

* * * * *